(12) United States Patent
Wobben (10) Patent No.: US 7,955,052 B2
(45) Date of Patent: Jun. 7, 2011

(54) LOAD SENSING ON A ROTOR BLADE OF A WIND POWER PLANT

(76) Inventor: Aloys Wobben, Aurich (DE)

( * ) Notice: Subject to any disclaimer, the term of this patent is extended or adjusted under 35 U.S.C. 154(b) by 0 days.

(21) Appl. No.: 12/538,801

(22) Filed: Aug. 10, 2009

(65) Prior Publication Data

US 2009/0297346 A1 Dec. 3, 2009

Related U.S. Application Data

(63) Continuation of application No. 10/539,502, filed as application No. PCT/EP03/14394 on Dec. 17, 2003, now Pat. No. 7,594,797.

(30) Foreign Application Priority Data

Dec. 18, 2002 (DE) .................................. 102 59 680

(51) Int. Cl.
 *F01D 25/02* (2006.01)
(52) U.S. Cl. .......................................... 416/61; 416/230
(58) Field of Classification Search ................ 416/61, 416/230
 See application file for complete search history.

(56) References Cited

U.S. PATENT DOCUMENTS

| | | | | |
|---|---|---|---|---|
| 2,473,147 A | * | 6/1949 | Jensen | 416/95 |
| 2,742,248 A | * | 4/1956 | Le Compte et al. | 416/95 |
| 4,026,660 A | | 5/1977 | Ueda et al. | |
| 4,255,974 A | * | 3/1981 | Dufrane et al. | 73/776 |
| 5,174,717 A | * | 12/1992 | Moore | 416/39 |
| 5,379,644 A | | 1/1995 | Yanagida et al. | |
| 6,619,918 B1 | * | 9/2003 | Rebsdorf | 416/1 |
| 6,940,186 B2 | | 9/2005 | Weitkamp | |

FOREIGN PATENT DOCUMENTS

| | | |
|---|---|---|
| DE | 3009922 A1 | 9/1981 |
| DE | 3712780 A1 | 10/1987 |
| DE | 3821642 A1 | 12/1989 |
| DE | 19748716 | 11/1998 |
| DE | 19731918 | 1/1999 |
| DE | 19847982 | 6/1999 |
| DE | 10113039 | 10/2002 |
| DE | 10160360 | 6/2003 |
| EP | 1359321 A1 | 11/2003 |
| JP | 63001912 A | 1/1988 |
| JP | 08261135 A | 10/1996 |
| JP | 2000018147 A | 1/2000 |
| WO | 03050412 A1 | 6/2003 |

* cited by examiner

*Primary Examiner* — Richard Edgar
(74) *Attorney, Agent, or Firm* — Seed Intellectual Property Law Group PLLC (57) ABSTRACT

A rotor blade of a wind power plant, comprising a rotor blade connection for connection to a hub of the rotor of a wind power plant and a blade tip disposed at the opposite end of the rotor blade. In order to provide a rotor blade in which flexing can be detected with simple means, at least one electrical conductor is laid over the length of the rotor blade, wherein the electrical conductor begins at the rotor blade connection, extends in the longitudinal direction of the rotor blade and back to the rotor blade connection, and that there is provided a detector which detects the electrical resistance of the conductor and is connected to an evaluation device which evaluates the electrical resistance.

16 Claims, 11 Drawing Sheets

Input pulse

Output pulse

Input pulse

Output pulse

LOAD SENSING ON A ROTOR BLADE OF A WIND POWER PLANT

CROSS-REFERENCES TO RELATED APPLICATIONS

This application is a continuation of U.S. patent application Ser. No. 10/539,502, filed Jan. 17, 2006, now pending, which is a National Stage of PCT/EP03/014394, filed Dec. 17, 2003, which claims priority to German Application No. 102 59 680.8, filed Dec. 18, 2002. Each of these applications is incorporated herein by reference in its entirety.

FIELD OF THE INVENTION

The present invention concerns a rotor blade of a wind power plant, comprising a rotor blade connection for connection to a hub of the rotor of a wind power plant and a blade tip disposed at the opposite end of the rotor blade. Such rotor blades have generally long been known and are used in almost all horizontal-axis wind power plants.

The invention further concerns a wind power plant having such rotor blades.

BRIEF SUMMARY OF THE INVENTION

Therefore one object of the present invention is to provide a rotor blade in which flexing can be detected by a simple device.

In a rotor blade of the kind set forth in the opening part of this specification that object is attained in that at least one electrical conductor is laid over the length of the rotor blade, wherein the electrical conductor begins at the rotor blade connection, extends in the longitudinal direction of the rotor blade and back to the rotor blade connection, and that there is provided a detector which detects the electrical resistance and that the detector is connected to an evaluation device which evaluates the electrical resistance of the conductor.

In that respect the invention is based on the realization that flexing of the rotor blade always leads to extension of the support structure and that such extension, when transferred to an electrical conductor, leads to a change in the electrical resistance of the conductor.

As that change in resistance is proportional to the extension of the conductor, the change in resistance is proportional to the flexing of the rotor blade. In the simplest case it is possible to predetermine a limit value for a change in resistance, the fact of that limit value being exceeded simultaneously indicating flexing of the rotor blade such as to cause structural damage. Recognition of that situation therefore permits exchange in good time or checking of the rotor blade in order to establish whether the rotor blade has to be replaced or not.

In a preferred embodiment of the invention the loading on the wind power plant can be inferred from the loading on the rotor blade and the wind power plant can be shut down when a predetermined limit value is exceeded. That reliably avoids further and also more severe loadings.

In order to be able to compensate for a temperature-dependent change in resistance of the electrical conductor and/or to afford a plurality of measurement results, it is possible to provide a plurality of electrical conductors. Those conductors extend in the longitudinal direction of the rotor blade and are connected to a detector. In that case a plurality of conductors can be connected to a detector or each conductor can be connected to its own detector. The conductor provided for temperature compensation is arranged in such a way that it is not subjected to the flexural loading and therefore only experiences a temperature-dependent change in resistance. In that way the temperature-induced change in resistance is known and can be suitably taken into account.

A plurality of conductors also permits redundant use. In the case of a problem on a conductor the change in resistance can always still be reliably detected by the redundant conductors. That eliminates the need for an expensive overhaul operation because of the failure of a conductor.

In addition the redundant implementation of the conductors also allows comparative ascertainment of the change in resistance. In that way the conductors can each be monitored relative to each other by a comparison in respect of the detected change in resistance.

In a particularly preferred feature at least one of the electrical conductors extends a predetermined distance in the longitudinal direction of the rotor blade, that distance however being shorter than the rotor blade length. That conductor does not reach the rotor blade tip but ends at a predetermined location on the rotor blade. In that way the individual conductors are influenced differently in dependence on the flexing of the rotor blade and change their resistance accordingly. Therefore the precise pattern of the flexing effect can be inferred from the different values in respect to the change in resistance.

In a preferred embodiment of the invention the conductors which are shorter than the rotor blade length can also be in the form of branches of a conductor which extend over the entire rotor blade length. For that purpose they are galvanically connected at predetermined locations to the conductor which extends over the rotor blade length. In that way the level of resolution in detecting rotor blade flexing can be varied in accordance with the number and spacings of the branches.

In order to avoid unwanted distortion of the electrical conductors, they are preferably connected to the support structure of the rotor blade and in a particularly preferred feature are incorporated into the support structure of the rotor blade. In that case, in a particularly preferred feature, the conductors which are to be stretched by the flexing of the rotor blade are incorporated into the support structure. Conductors which are galvanically connected as branches to such conductors and which here perform the function of return conductors can also be laid freely outside the support structure, for example in the form of a cable.

In that respect it is particularly advantageous for at least one electrical conductor to be provided in each support structure in the longitudinal direction of the rotor blade. That arrangement also makes it possible to detect the direction of flexing of the rotor blade as one of the electrical conductors is subjected to a stretching effect and thus changes, more specifically increases, its resistance, while at least one other conductor is not stretched. Rather, with a suitable mounting configuration, that conductor is subjected to a compression loading instead of a tension loading and is thus upset rather than elongated. Accordingly its resistance value changes at most in the opposite direction. The resistance therefore decreases.

In a particularly preferred feature the electrical conductors, in accordance with the invention, include at least one predetermined aluminum component or comprise aluminum. That already affords a significant change in resistance in the region of elastic deformation of the conductor, that change in resistance being completely reversible and thus repeatable. In a corresponding manner flexing of the rotor blade can be permanently monitored without replacement of the electrical conductors or even the entire rotor blade being necessary after a flexing effect has occurred. It will be noted that in principle any electrical conductor is suitable as a sensor. In that respect however the conductor should involve a predetermined degree of surface roughness in order to achieve a good mechanical join to the surrounding material.

In order not to have to replace the entire rotor blade in the case of a problem in the region of the electrical conductors, for example after over-extension or due to material flaws, the conductors are advantageously incorporated into a member which is connected to but releasable from the support structure. Such an embodiment of the invention also makes it possible for rotor blades which have already been manufactured to be retro-fitted.

BRIEF DESCRIPTION OF THE SEVERAL VIEWS OF THE DRAWING(S)

The invention is described in greater detail hereinafter with reference to the Figures in which.

DETAILED DESCRIPTION OF THE INVENTION

Figure 1:
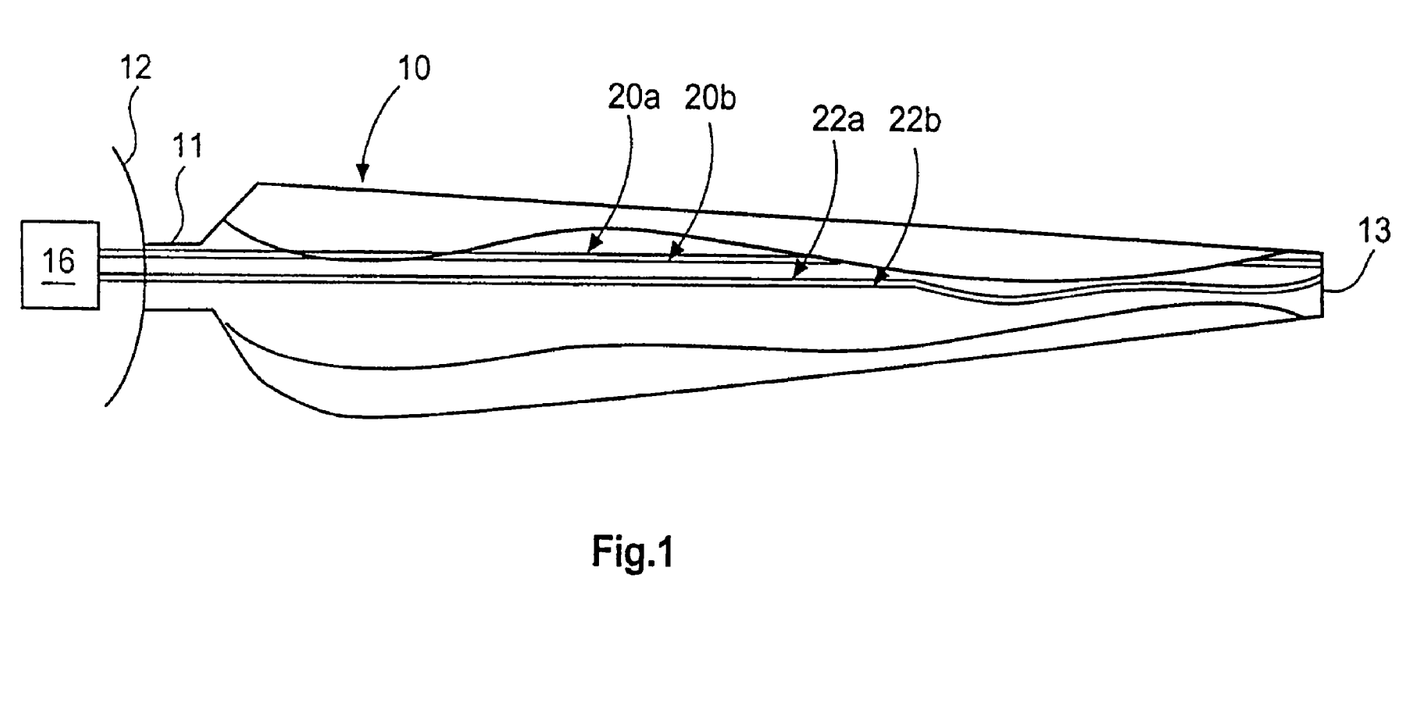
FIG. 1 shows a plan view of a partially sectioned rotor blade of a first embodiment of the invention.

FIG. 1 is a plan view of a rotor blade 10. To clearly illustrate the structure, the rotor blade 10 is partly sectioned so that it is possible to see the path of two conductors 20, 22.

The rotor blade 10 is mounted with a rotor blade root 11 to the hub 12 of a wind power plant which is only indicated for orientation purposes here and in the other Figures. A first conductor 20 and a second conductor 22 extend in the rotor blade from the rotor blade root 11 in the longitudinal direction of the rotor blade to the rotor blade tip 13 and back again. Accordingly each of the conductors 20, 22 includes an outgoing conductor 20a, 22a and a return conductor 20b, 22b.

Both conductors 20, 22 are connected to a detector 16 which ascertains the electrical resistance of both conductors 20, 22.

In this case the first conductor 20 is shown as being straight. That symbolizes the fact that this conductor is connected to the rotor blade in such a way that stretching of the rotor blade structure also leads to stretching of that conductor 20. The second conductor 22 is shown as being laid in a non-straight configuration in the region of the rotor blade tip 13. A non-straight configuration indicates that this conductor is not joined to the rotor blade 10 in such a way that it is deformed therewith. Rather, that second conductor should precisely not be deformed. Its resistance accordingly changes above all in dependence on temperature so that the influence of temperature on the change in resistance is known and can be taken into account when detecting the change in resistance of the first electrical conductor 20, and does not lead to false results.

The detector 16 can be connected to the control system of the wind power plant so that flexing of the rotor blades can be taken into consideration in operation of the wind power plant.

Figure 2:
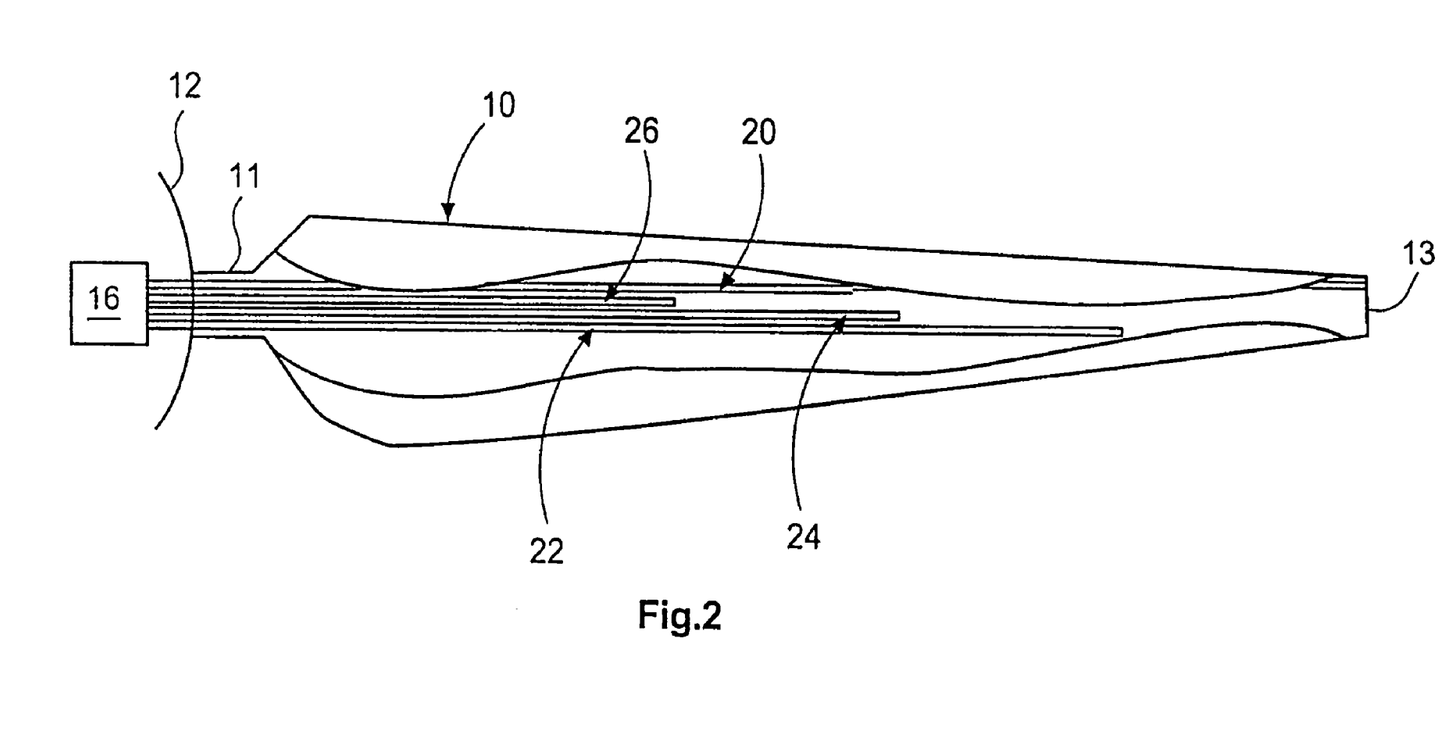
FIG. 2 shows a plan view of a partially sectioned rotor blade of a second embodiment of the invention.

FIG. 2 shows a similar structure to that which has already been described with reference to FIG. 1. It will be noted that four electrical conductors 20, 22, 24, 26 are illustrated here. A conductor for temperature compensation is not shown here for the sake of clarity of the drawing, but naturally can also be provided in this embodiment.

In FIG. 2 all four electrical conductors 20, 22, 24, 26 are connected to the rotor blade 10 in such a way that they follow the flexing of the rotor blade 10. As however the conductors extend by different distances in the longitudinal direction of the rotor blade 10, it is possible to infer the deformation of the rotor blade 10 from the change in resistance of the individual conductors 20, 22, 24, 26 when their length is known.

If only the first conductor 20 which extends as far as the rotor blade tip 13 were present, it would only be possible to infer flexing per se from the change in resistance. As however the second conductor 22 does not extend as far as the rotor blade tip 13, it is possible to conclude from a change in resistance in the first conductor 20 that flexing is occurring at the rotor blade tip. If no changes in resistance occur in respect of the other conductors 22, 24, 26, this meaning here and hereinafter stretch-dependent changes in resistance, then that flexing is clearly restricted only to the outer region of the rotor blade 10, near the rotor blade tip.

If changes in resistance occur at the conductors 20, 22 and 24 while the resistance of the conductor 26 remains unchanged, that indicates that the rotor blade is flexed approximately in the outer half, in the longitudinal direction.

In FIG. 2 the conductors 20, 22, 24, 26 are also connected to the detector 16 which in turn can be connected to the control system for controlling the wind power plant.

Figure 3:
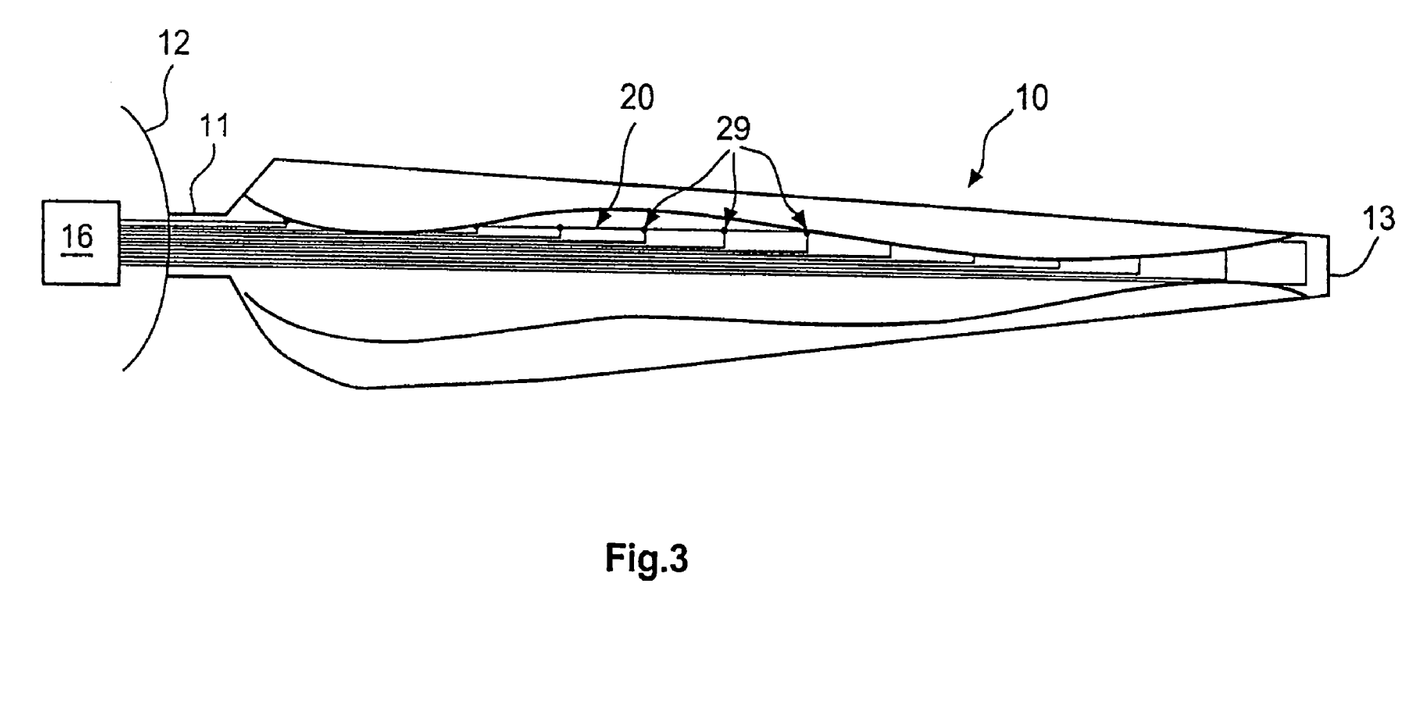
FIG. 3 shows a plan view of a partially sectioned rotor blade of a third embodiment of the invention.

FIG. 3 shows an alternative embodiment of the invention. A conductor 20 extends in the rotor blade 10 from the detector 16 along the entire length of the rotor blade as far as the rotor blade tip 13. Branches 28 are connected to that conductor 20 by means of a galvanic connection 29. The choice of the number and position of the branches can predetermine which regions of the rotor blade 10 are to be monitored, with what accuracy. Or, to put it another way, with what level of resolution and in what region of the rotor blade 10, flexing thereof is to be detected.

Particularly in the embodiment of the invention shown in FIG. 3, it will be clear that the use of a connector in the region of the rotor blade root 11 is advantageous (although not shown here) as, in production of the rotor blade 10, the conductors 20, 28 can already be connected to the connector and the connections can be tested. Upon assembly of the rotor blade at the building site, it is then possible to use cables which have already been made up in order to make the connection to the detector. The connector provides a simple assembly procedure with a low level of susceptibility to error.

Figure 4:
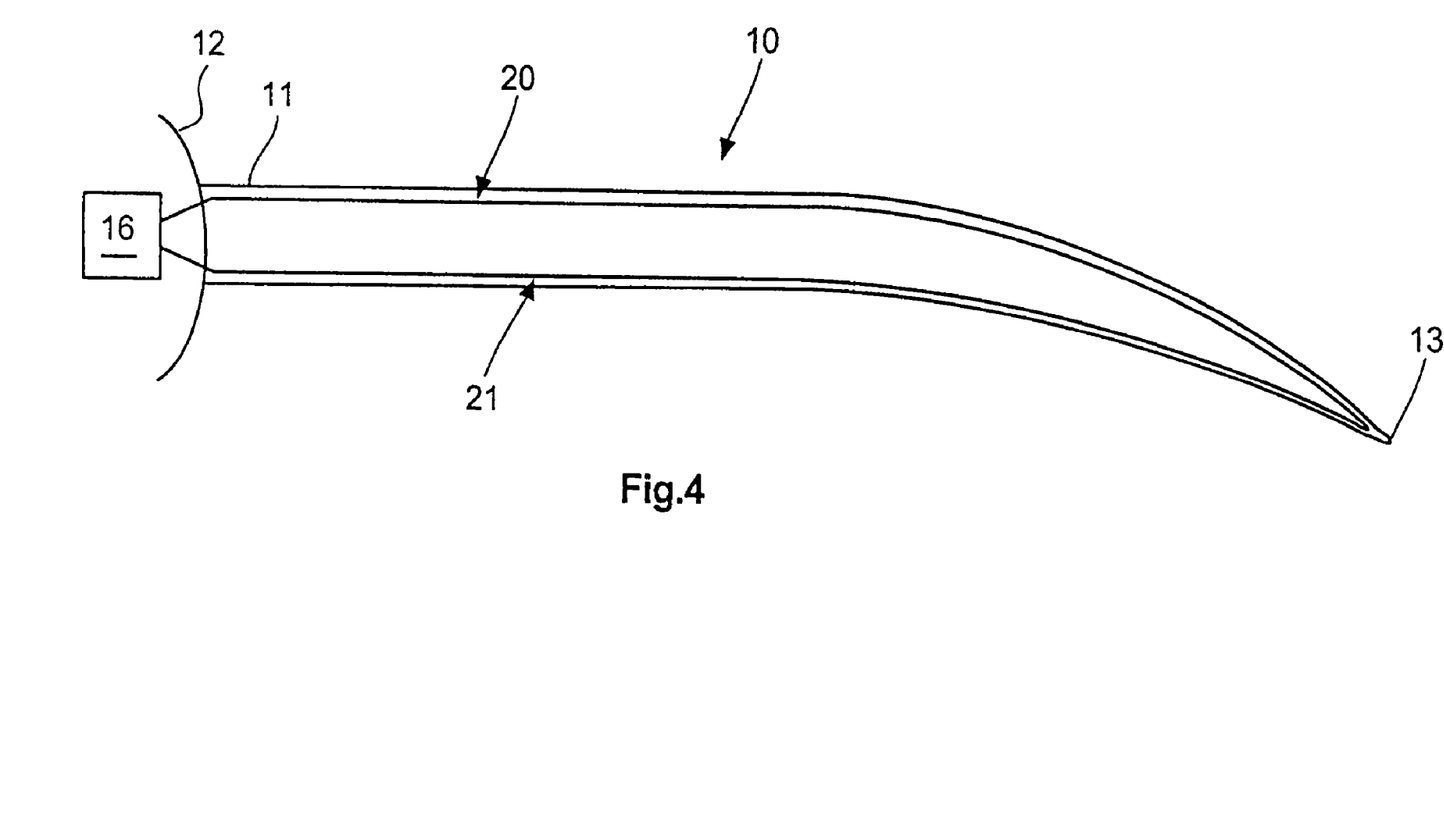
FIG. 4 is a simplified side view of a rotor blade which is flexed in a first manner.

FIG. 4 is a simplified side view of a flexed rotor blade 10. FIG. 4 also shows the blade root region 11, the indicated hub 12 and the detector 16. In this case, the spacing of the conductors 20 relative to the surface of the rotor blade 10 is in no way to be interpreted as being true to scale. Rather, the situation is that detection of the degree of flexing is more accurate, the closer that the conductors 20 extend to the surface of the rotor blade 10. For description purposes, naturally the surface of the rotor blade 10 and the conductors 20 are to be distinguishable in FIG. 4. The rotor blade 10 is bent downward in FIG. 4. Accordingly, the side of the rotor blade 10, which is in the direction of flexing, is the underside, while the opposite side is accordingly the top side.

It will be clearly seen from FIG. 4 that a conductor 20 is provided at the top side of the rotor blade 10 and a conductor 21 is provided at the underside. With the illustrated flexing of the rotor blade, the conductor 20 at the top side of the rotor blade is stretched and involves a significant change in its resistance. The change can be reliably detected by the detector 16. With this flexing of the rotor blade, the conductor 21 at the underside of the rotor blade 10 is not stretched but is at best upset. That is certain not to produce any increase in resistance in that conductor. Consequently, the direction of flexing of the rotor blade can be reliably inferred from the change in resistance in the conductor 20 at the top side of the rotor blade 10.

Figure 5:
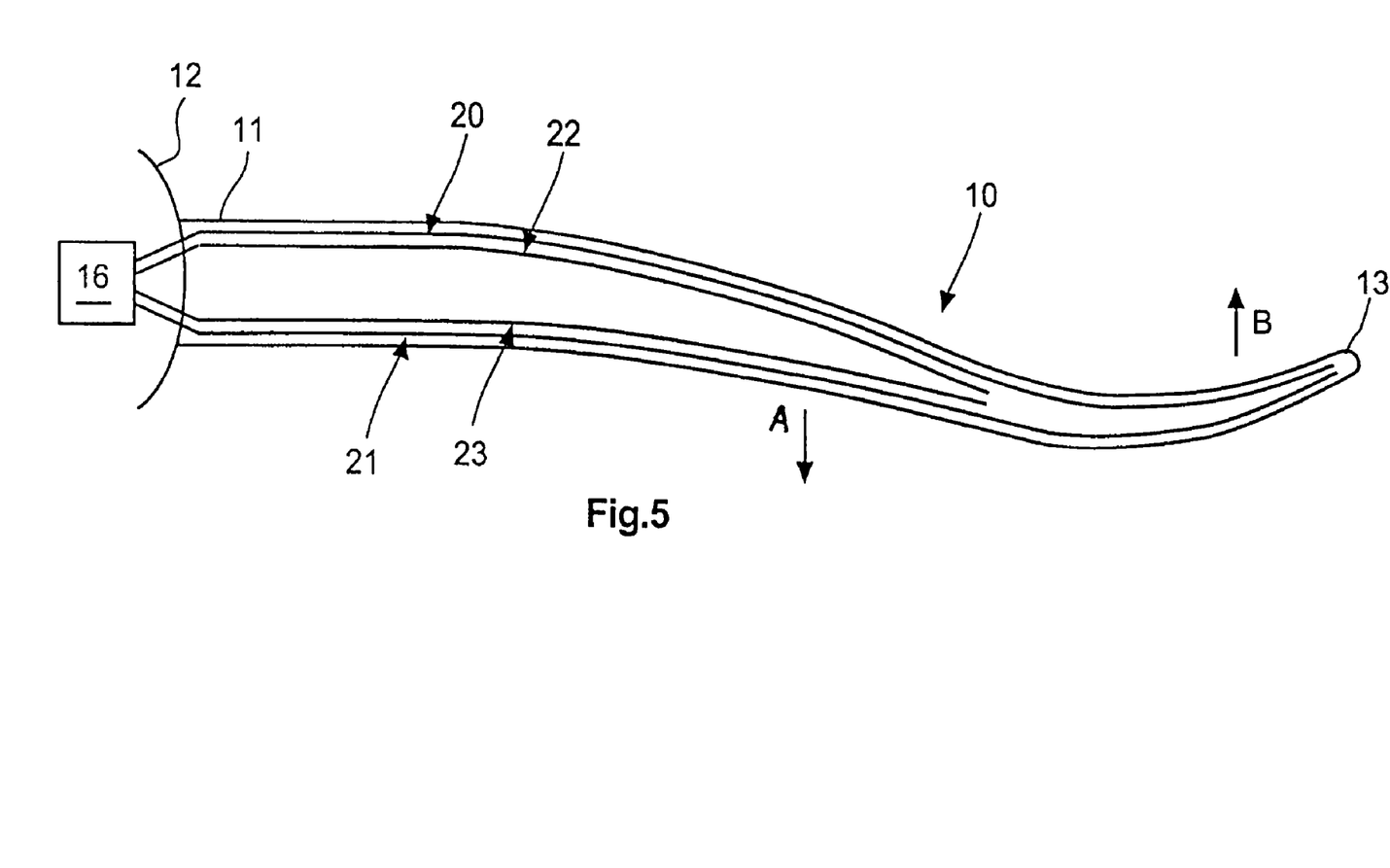
FIG. 5 is a simplified side view of a rotor blade which is flexed in a second manner.

FIG. 5 shows a special case in terms of flexing of the rotor blade 10 which, however, is in no way unusual in practice. In this case, the rotor blade is flexed in its central region in the direction of the arrow A (towards the underside), but in its outer region near the rotor blade tip 13 it is flexed in the direction of the arrow B, that is to say towards the top side of the rotor blade. Equipping the rotor blade 10 with conductors 20, 21 which both extend as far as the rotor blade tip 13 would involve stretching for both of those conductors.

If a fault situation is just disregarded, it is already possible to deduce therefrom dangerous flexing of the rotor blade 10 and the plant can be suitably controlled, for example shut down. It will be noted however that the actual configuration involved in flexing of the rotor blade still cannot be recognized therefrom. As further conductors 22, 23 which do not extend to the rotor blade tip 13 are provided, then, in the illustrated flexing situation, the conductor 22 is also stretched and therefore correspondingly increases its resistance. In a corresponding manner, the actual flexing of the rotor blade 10 can now be inferred from detection of the resistances or changes in resistance of the conductors 20, 21, 22, 23 by the detector 16. In that respect it should be emphasized once again that the conductors 20, 21, 22, 23 extend in a very closely mutually juxtaposed relationship and as close as possible to the respective surfaces of the rotor blade 10 so that the stretch, which is assumed to be apparent in FIG. 5, of the second conductor 23 at the underside of the rotor blade does not in reality occur.

As an alternative to this embodiment with a plurality of conductors 20, 21, 22, 23 of differing lengths which here can be in the form of conductor loops, the embodiment of the invention illustrated in FIG. 1 can naturally also be used at the top side and/or at the underside of the rotor blade 10. That naturally also affords the advantages described therein, in particular the possibility of predetermining the degree of accuracy in terms of detection of rotor blade flexing, by a choice in the number and spacing of the branches.

Figure 6:
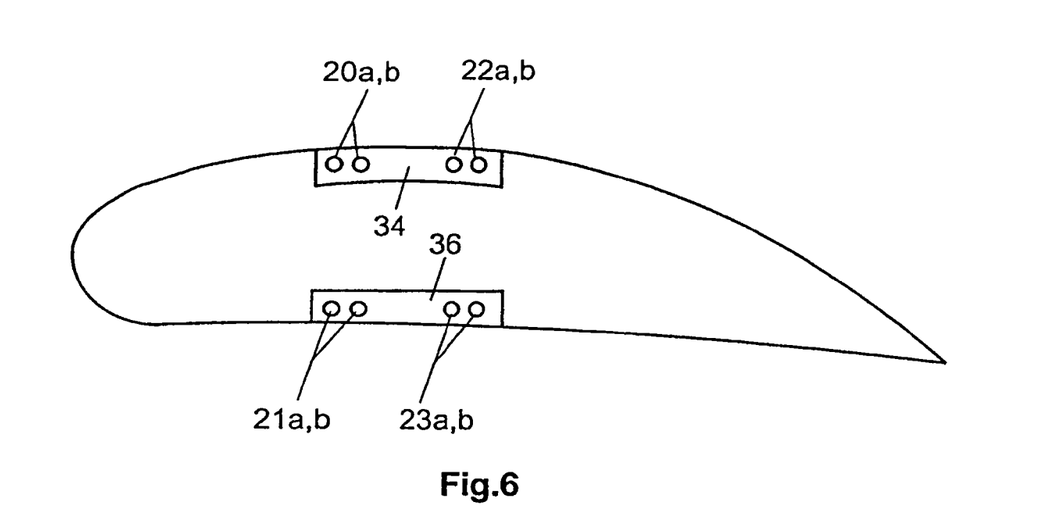
FIG. 6 shows a simplified cross-sectional view of a rotor blade.
Figure 7:
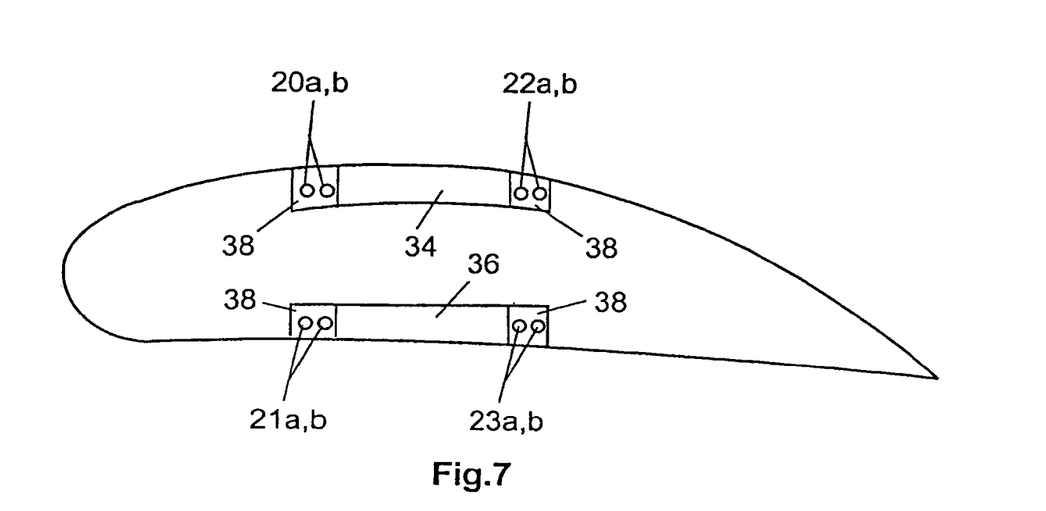
FIG. 7 shows a further simplified cross-sectional view of a rotor blade.

FIGS. 6 and 7 are simplified views in cross-section through a rotor blade according to the invention. Support structures 34, 36 extending in the longitudinal direction are shown in the rotor blade illustrated in FIG. 6. The support structures 34, 36 can be, for example, roving belts, that is to say support structures formed from glass fiber bundles and epoxy resin, which extend substantially over the full length of the rotor blade.

Electrical conductors 20, 21, 22, 23 are embedded in those support structures 34, 36. In that respect outgoing and return conductors are respectively identified by the letters a and b in order to make it clear that each arrangement involves a conductor which extends from the rotor blade root in the longitudinal direction of the rotor blade and back to the rotor blade root.

Incorporating the conductors 20, 21, 22, 23 into the support structures 34, 36 means that the course thereof can be very precisely established. It also ensures that they extend as closely as possible to the respective surface of the rotor blade so that it is possible to draw conclusions from the changes in resistance, with an adequate degree of certainty.

FIG. 7 also shows the support structures 34, 36. It will be noted in this case however that the conductors 20, 21, 22, 23 are not incorporated into the support structures 34, 36 themselves but in carriers 38. Those carriers 38 can be of the same structure as the support structures 34, 36 so that the co-operation between the carriers 38 and the conductors 20, 21, 22, 23 exactly corresponds to the co-operation of the conductors with the support structures 34, 36.

In this case the carriers 38 can be releasably connected to the support structures 34, 36. If replacement of a conductor should be required due to material flaws, or other damage that does not necessarily result in loss of the complete rotor blade, or very expensive repair thereof the corresponding carrier 38 is released from the support structure 34, 36 and replaced by a new carrier 38.

This embodiment of the invention, with a suitable choice with respect to the connection between the support structures 34, 36 and the carriers 38 or the connection between the surface of the rotor blade 10 (naturally at the inside) and the carriers 38, permits rotor blades 10 which have already been manufactured to be retro-fitted with new carriers 38.

Figure 8:
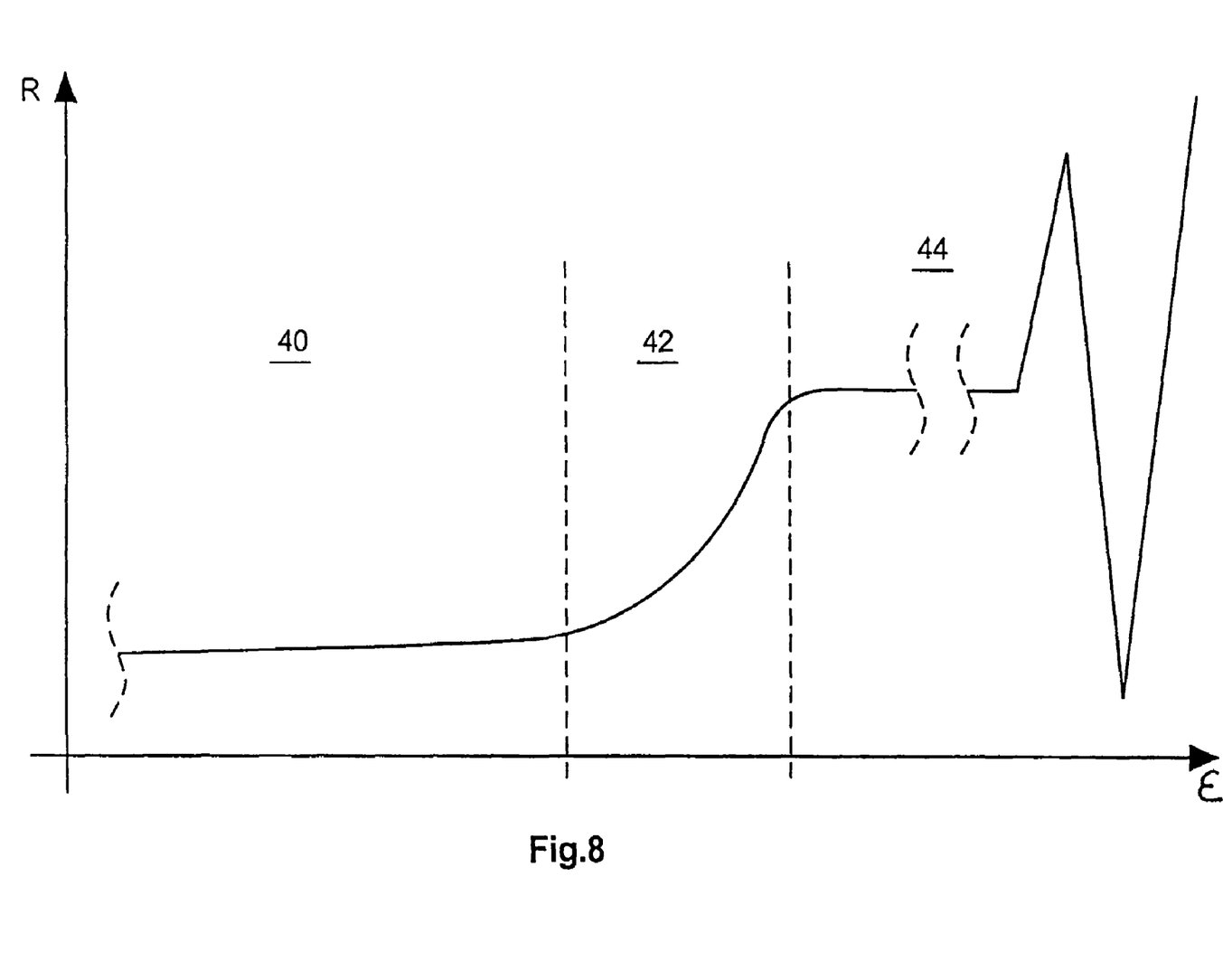
FIG. 8 shows the resistance pattern of a conductor used according to the invention.

FIG. 8 shows the empirically ascertained configuration of the electrical resistance of a wire in dependence on the tensile stress. The left-hand region 40 of the curve extends in a straight line, the middle region 42 of the curve rises significantly while in the right-hand region 44 the curve initially extends in a straight line again before there is an abrupt increase in resistance with a subsequent reduction in resistance and finally an increase in resistance.

The right-hand region 44 of the curve is characteristic of the electrical conductor tearing away, at an excessively high level of tensile stress. In contrast the change in resistance in the middle region 42 of the curve is in a range of elastic deformation of the electrical conductor. In ascertaining that curve, the range of elastic deformation of the electrical conductor was determined from a stretch in the longitudinal direction of less than one percent of once the conductor length. In the case of aluminum, range of elastic deformation is the region of 0.3 percent.

Stretch of an aluminum wire in the longitudinal direction by 0.3 percent is accordingly elastic deformation which results in a significant and detectable change in resistance, measured up to 25 mΩ.

As the deformation is elastic the electrical conductor is not damaged thereby and the change in resistance is reliably reproducible. Accordingly flexing of the rotor blade can be repeatedly detected with the same electrical conductors.

Figure 9:
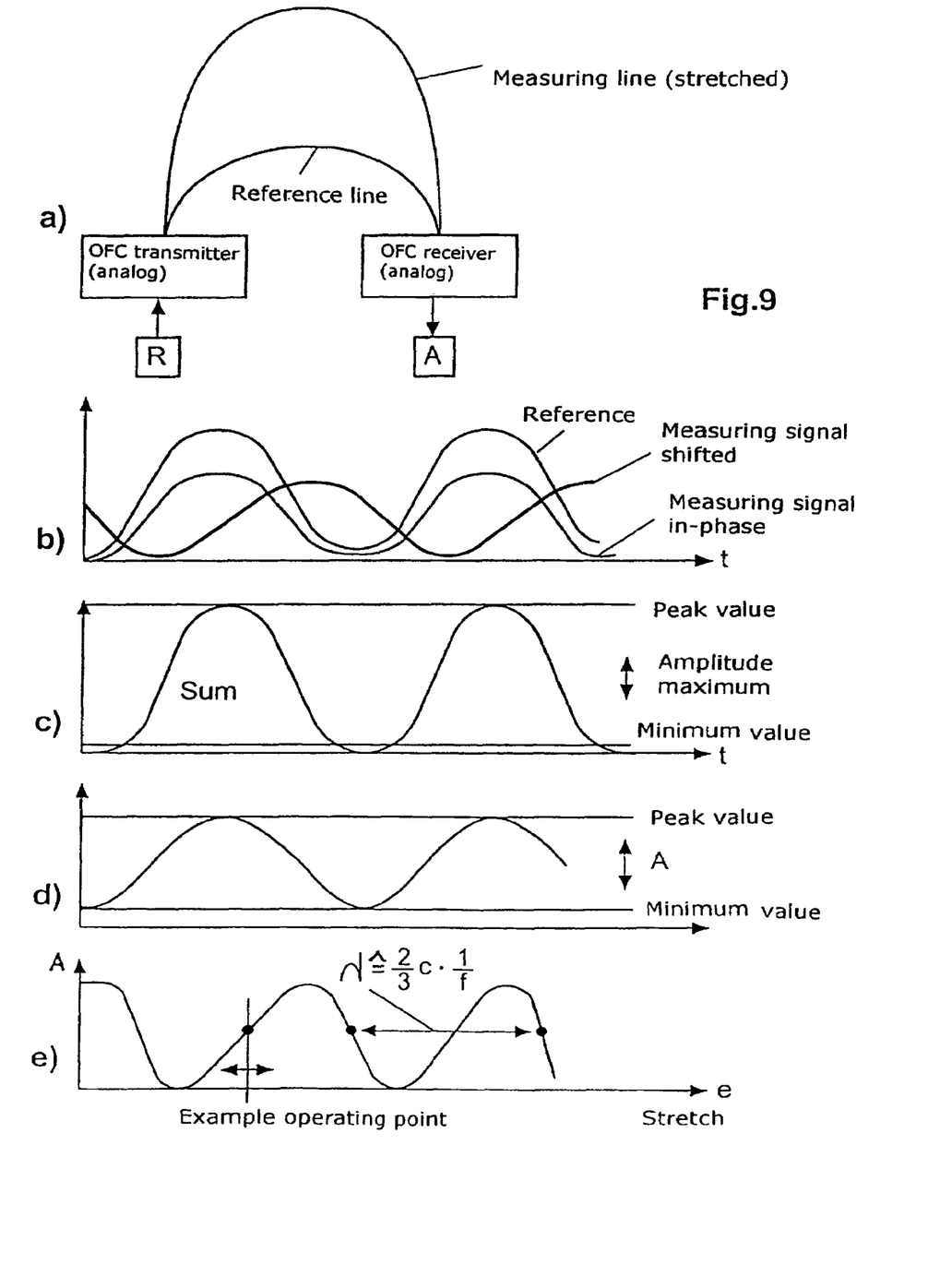
FIG. 9 shows a configuration in principle of a rotor blade according to the invention together with measuring diagrams b)-e) in the case of an analog phase shift.
Figure 10:
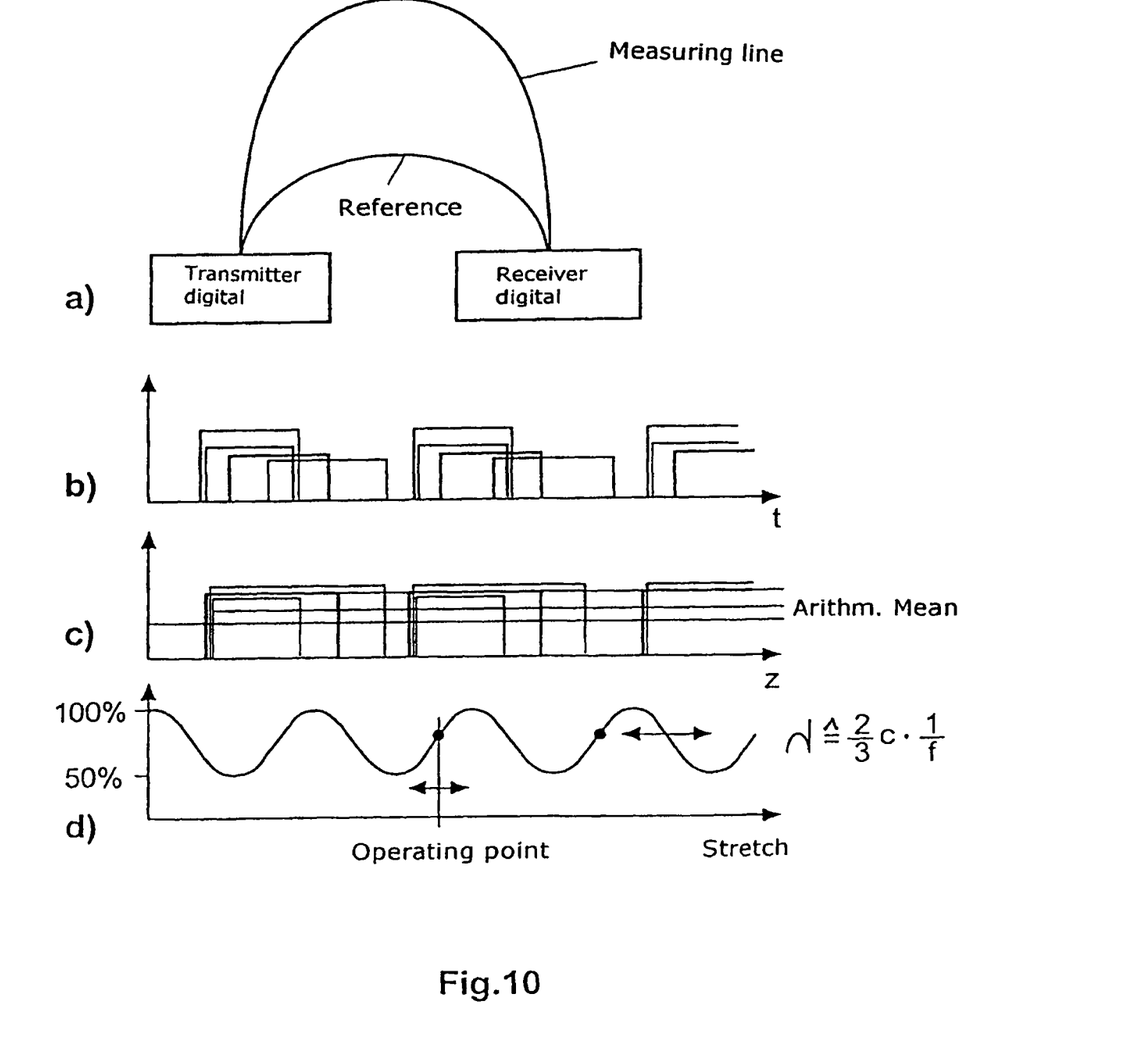
FIG. 10 shows a view in principle of a measuring device according to the invention a) in the case of a rotor blade and the resulting measuring diagrams in the case of a digital phase shift (b)-d))

Further, FIGS. 9 and 10 respectively show an addition to and an alternative to the above-described process or above-disclosed approach. That approach can be implemented with analog and/or digital signals. What is common to both solutions as shown in FIGS. 9 and 10 is that the delay time of the signals in the circuit is not involved in the delay time detection procedure. In that way it is possible to ascertain the actual delay time in the line.

The structure of the analog and digital solutions in FIGS. 9 and 10 is substantially comparable. In both cases, between the transmitter and the receiver there are two lines, namely a reference line whose length does not change and in parallel therewith a measuring line, by way of the stretch of which the flexing for example, of a rotor blade is detected. Besides the fact that the delay times can be compared between the reference line and the measuring line, those two lines are also subject to the same thermal influences so that the effect thereof is compensated.

In the analog arrangement (first alternative), in the rest condition the reference signal (an analog electrical signal) and the measuring signal are in-phase. Accordingly there is a sum signal of the same frequency but higher amplitude.

If a phase shift occurs due to stretching of the measuring line the sum signal is naturally also changed. On the one hand the peak-to-peak value is less than in the case of in-phase signals, while in addition there is also a modified envelope curve for the sum signal.

The way in which such changes are detected is sufficiently known in the state of the art. It can be readily seen that the amplitude becomes less, up to a phase shift of 180°. Beyond that range, up to a complete period, the signs also have to be taken into consideration in order to obtain reliable information regarding the phase position.

In the case of the digital solution, with in-phase input of the signals at the receiver, the arrangement involves the lowest arithmetic mean (naturally also in dependence on the pulse duty factor). Assuming a pulse duty factor which is still the same however, the arithmetic mean increases with increasing phase shift between the reference signal and the measurement signal. That is therefore a measurement of the phase shift of the signals at the receiver.

The above-described processes can be implemented with electrical signals, optical signals and acoustic signals. With a slight amount of stretch, the choice of a high frequency is advantageous (that is to say a frequency of more than 1 kHz, preferably several MHz), while in the case of a large amount of stretch, the choice of a low frequency is preferred to obtain a phase shift within the range of one period.

The present application expressly incorporates the content of German patent applications Nos 38 21 642 and 37 12 780. It is known from those applications how changes in length or spacing, which are caused by a change in physical parameters such as temperature or pressure, can be determined by means of delay time measurement of electrical signals in an optical fiber cable which is exposed to the physical parameter. Signals are fed into the optical fiber cable by way of an optical multivibrator. In that situation, the total delay of a plurality of pulses is determined by way of a high-frequency counter. By comparison with a standard counting result (reference), the deviation of the actually ascertained counting result from that standard counting result is established, the difference in length or spacing occurring is ascertained therefrom, and that difference in length or spacing is converted into the physical parameter to be determined.

DE 37 12 780 discloses a process and an apparatus for precise and fast measurement of the length of a line to be tested as far as an electrical discontinuity in the line, wherein a pulse edge is passed by a pulse edge generator to an end of the line, the reflected pulse edge which returns from the discontinuity to the one end is detected, the production of a pulse edge is triggered after a predetermined time after detection of the reflected pulse edge so that the pulse edge generator is caused to repeatedly produce the pulse edge at a frequency which is related to the transit time delay in the length of the line, and that frequency is measured. DE 37 12 780 thus describes how a 'discontinuity' in the line can be detected and also discloses the possibility, instead of using the delay time, of using the inverse, that is to say more specifically the frequency.

In accordance with DE 38 21 642, the delay time in a line between a transmitter and a receiver is detected, and that is effected by means of the so-called stopwatch. The counting of clocks of a signal at a markedly higher frequency begins with the emission of a pulse and that counting procedure is continued until the receiver receives the pulse. The count value is then a measurement of the delay time.

Figure 11:
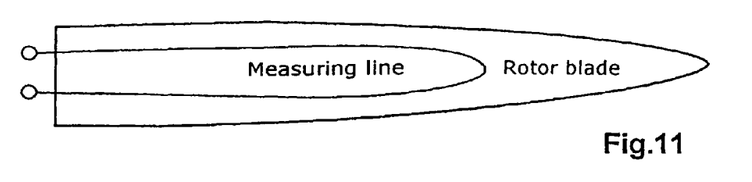
FIG. 11 shows a view in principle of a rotor blade with a measuring line.
Figure 12:
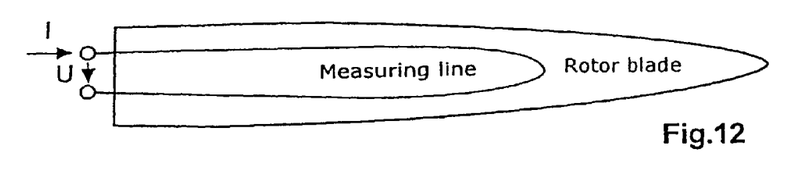
FIG. 12 shows a view as illustrated in FIG. 11 with impressed current or voltage.

Reference is now made to FIG. 11 which shows a rotor blade with a measuring line arranged therein and which is preferably let in the surface of the rotor blade in the form of a measuring wire or optical fiber cable (OFC). Mechanical loads, such as wind loads, flex the rotor blade and the measuring line is stretched or upset in its length. The change in load is proportional to the change in length:

$$\Delta F \sim \Delta l.$$

A change in length between 0.0% and 0.2% is to be expected, and corresponds to between 0.0% and 100% load. The task therefore is to determine the change in length with the highest possible level of resolution.

As a first solution, the ohmic resistance of the wire can be assumed to be proportional to the length and thus also to the load.

$$\Delta R \sim \Delta l \sim \Delta F.$$

A current is impressed into the wire and the voltage drop is measured by technique described above in relation to FIG. 2.

Tests have shown that this principle is operable.

There are however some problems because a very high level of measuring accuracy is required (<0.002%) as the signal is 0.2% of the absolute value and also has to be subdivided into at least 100 steps. In addition the ohmic resistance of the wire changes very severely with the wire temperature. Superimposed on the signal may be noise produced by electrical and magnetic fields. The noise becomes particularly noticeable during thunderstorms. The wire with the electronics connected thereto can be damaged by direct lightning hits.

Figure 13:
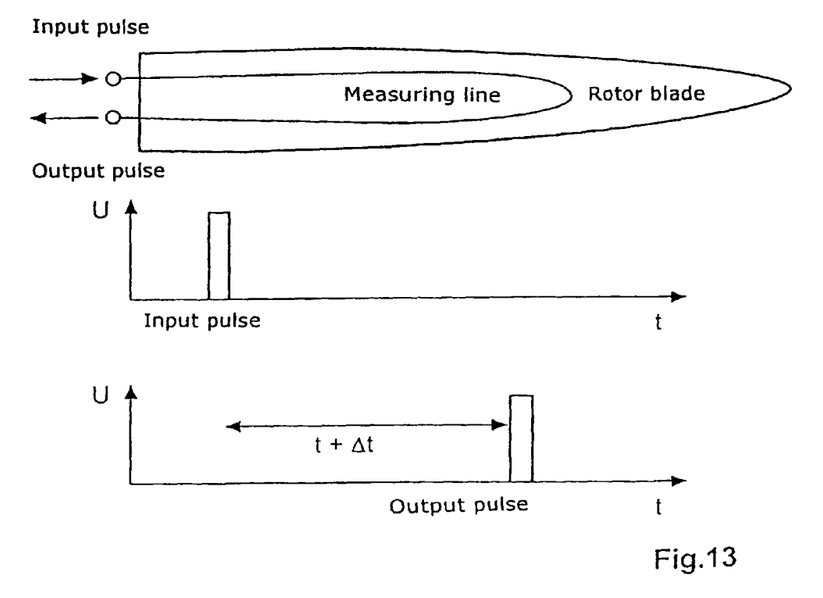
FIG. 13 shows a view in principle of a rotor blade according to the invention with a measuring line in the case of input of an input pulse and measurement of an output pulse and a time diagram corresponding thereto.

An alternative solution is shown in FIG. 13. In this case the length of the transit wire is determined by the delay time of a pulse. The speed is ⅔rds light speed, that is to say about 200,000 km/s.

As can be seen from FIG. 13:

$$\Delta t \sim \Delta l \sim \Delta F$$

and the change in transit time is a measurement of the load.

With an assumed line length of 40 m this gives t=200 ns with a superimposition of Δt of between 0 and 400 ps.

As that time is not so easy to detect by a measurement procedure, the inverse is formed, more specifically as:

$$f = \frac{1}{t + \Delta t}$$

That now affords a frequency.

Frequency values are very simple to determine and the measurement value can be resolved as finely as may be desired (by adaptation of the gate time of the frequency counter).

A frequency is now formed from the delay time of the signal by a procedure whereby the incoming pulse immediately sends a fresh pulse into the line (stopwatch process). The number of pulses emitted per second forms the frequency.

Figure 14:
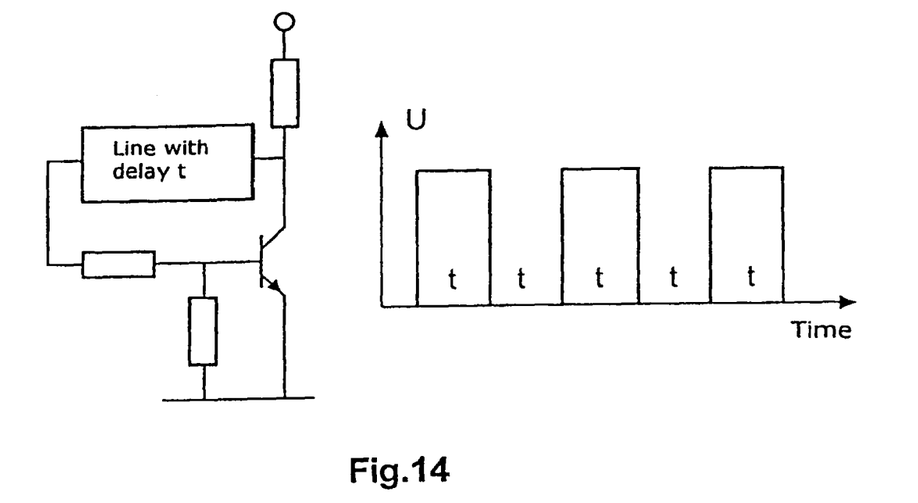
FIG. 14 shows a switching diagram for a stopwatch process together with time diagram.

FIG. 14 shows a corresponding circuit diagram in that respect together with a timing diagram.

The pulse is replaced by a change in level and, as expected, there is a frequency of:

$$f = \frac{1}{2t}, \text{ that is to say with } t = \frac{1}{2\left(\frac{2}{3}c\right)}$$

With a line length of 40 m that gives:

$$f = \frac{40 \text{ m}}{2(200 \cdot 10^{-9} \text{ m/s} + \Delta t)} = 2.5 \text{ MHz}$$

Due to the effect of load, there are frequencies of between 2.5 MHz and 2.505 MHz, that is to say a change in value of 5000 Hz.

A frequency counter with a gate time of 20 ms would deliver 50 values per second with a resolution with respect to the load of 1%. Those values then already comprise mean values of 50 individual length measurements.

There is therefore the advantage that no sensitive analog sensor system is required as there is a high signal-to-noise ratio (0V or 10V) and there are no troublesome delay time changes due to temperature fluctuations.

That applies in particular in accordance with the arrangement shown in FIGS. 9 and 10 where, besides the measuring line, there is also a reference line.

Figure 15:
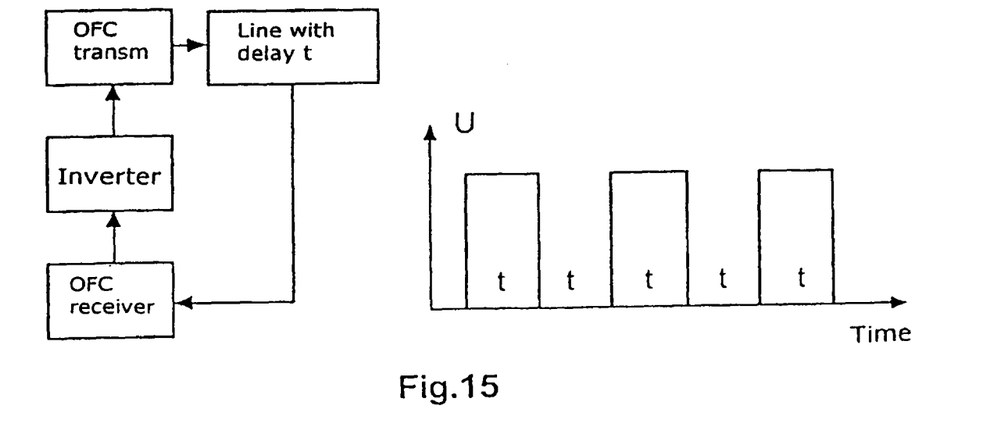
FIG. 15 shows a circuit as illustrated in FIG. 14 but for an optical structure showing the corresponding measuring time diagram.

The above-described solution can also be implemented optically. In that case a wire is replaced by an optical fiber cable and the feedback is effected by an OFC transmitter and an OFC receiver, as is shown in FIG. 15.

In this case the advantages are that there is no need for a sensitive analog sensor system as there is a high signal-to-noise ratio (light on or off), there are no troublesome delay time changes due to temperature fluctuations, there is no noise disturbance on the optical fiber cable due to electrical or magnetic fields and no effects due to a lightning strike.

It is to be expected that in practice flexing of the blade is already to be clearly measured with a change in length of less than 1 mm. Insofar as the present application describes that the solution according to the invention is to be used in relation to a change in length of the rotor blade, it is to be noted that it is also possible to measure twisting of the rotor blade if the measuring line is correspondingly arranged in a spiral shape on the surface of the rotor blade so that twisting of the rotor blade also automatically leads to a change in length of the wound-on measuring line.

In particular the measuring method according to the invention can also be used for monitoring by a measuring procedure portions of the rotor blade with respect to their loading and also lengthwise stretching, which can be very helpful in particular in the blade tip region when gusts occur in order to detect better than hitherto the risks involved in a specific individual case of given blade loads.

It should be expressly pointed out that what is disclosed in FIGS. 11 to 14 can obviously also be readily combined with what is disclosed in the other Figures. When reference is made to a stopwatch process, it is hereby made clear that this means inter alia that the stopwatch is stopped upon reception of the emitted pulse and started again at the same time, and accordingly signifies the frequency of the stop/start cycles on a given time range, for example 1 second.

In that respect it is possible to envisage any form of a pulse signal, inter alia also a chirp pulse signal, in accordance with the sine x/x function.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A rotor blade for a wind power plant having a hub and a rotor, comprising:
    a rotor blade connector adapted for connection to the hub of the rotor of the wind power plant;
    a blade tip disposed at an opposite end of the rotor blade from the rotor blade connector;
    an electrical conductor positioned along a length of the rotor blade, the electrical conductor beginning at the rotor blade connector, and extending in a longitudinal direction of the rotor blade to proximate the blade tip and back to the rotor blade connector, and the electrical conductor configured to couple to a load detector; and
    an additional electrical conductor extending a predetermined distance in the longitudinal direction of the rotor blade, said predetermined distance being shorter than the length of the rotor blade, wherein the additional electrical conductor is galvanically connected at a predetermined location to the electrical conductor extending to proximate the blade tip.

2. The rotor blade of claim 1, further comprising at least one additional electrical conductor extending from the rotor blade connector in the longitudinal direction of the rotor blade and back again, the at least one additional electrical conductor configured to couple to the load detector.

3. The rotor blade of claim 2, wherein the at least one additional electrical conductor extends a second predetermined distance in the longitudinal direction of the rotor blade, said second predetermined distance being shorter than the length of the rotor blade.

4. The rotor blade of claim 1, wherein the electrical conductor is fixedly connected to a support structure of the rotor blade.

5. The rotor blade of claim 4, wherein the electrical conductor is enclosed in the support structure of the rotor blade.

6. The rotor blade of claim 4, wherein the electrical conductor is enclosed in a carrier that is connected to but releasable from the support structure.

7. The rotor blade of claim 4, wherein the electrical conductor is provided on or in the support structure in the longitudinal direction of the rotor blade.

8. The rotor blade of claim 1, wherein the electrical conductor comprises aluminum.

9. The rotor blade of claim 1, wherein the electrical conductor has a predetermined surface roughness.

10. The rotor blade of claim 1, wherein the electrical conductor is further configured to couple to a plug connector in a region of the rotor blade connection.

11. The rotor blade of claim 1, wherein the electrical conductor is mechanically coupled to a body of the rotor blade such that a longitudinal length of the electrical conductor changes as the rotor blade deforms to provide a measurable change in resistance of the electrical conductor detectable by the load detector.

12. The rotor blade of claim 1, wherein the electrical conductor is embedded in a body of the rotor blade.

13. The rotor blade of claim 1, wherein the electrical conductor is mechanically coupled to a body of the rotor blade, the electrical conductor has a first length when the rotor blade is unloaded and a second length when the rotor blade is loaded as air flows along the rotor blade to rotate the rotor, and the first length is different from the second length.

14. The rotor blade of claim 1, wherein the electrical conductor includes an aluminum wire having an elastic strain of about 0.3 percent that results in a change in resistance of the aluminum wire up to about 25 milliohms.

15. A wind power plant comprising the rotor blade of claim 1.

16. A rotor blade for a wind power plant having a hub and a rotor, comprising:

a rotor blade connector adapted for connection to the hub of the rotor of the wind power plant;

a blade tip disposed at an opposite end of the rotor blade from the rotor blade connector;

an electrical conductor positioned along a length of the rotor blade, the electrical conductor beginning at the rotor blade connector, and extending in a longitudinal direction of the rotor blade to proximate the blade tip and back to the rotor blade connector, and the electrical conductor configured to couple to a load detector; and a plurality of additional electrical conductors extending from the rotor blade connector in the longitudinal direction of the rotor blade and back again, each of the additional electrical conductors configured to couple to the load detector, and wherein at least one of the additional electrical conductors extends a predetermined distance in the longitudinal direction of the rotor blade and is galvanically connected at a predetermined location to the electrical conductor extending to proximate the blade tip, the predetermined distance being shorter than the length of the rotor blade.

* * * * *